April 8, 1952     A. A. KLEBBA ET AL     2,592,159
TIDE GAUGE
Filed Dec. 23, 1946     2 SHEETS—SHEET 1
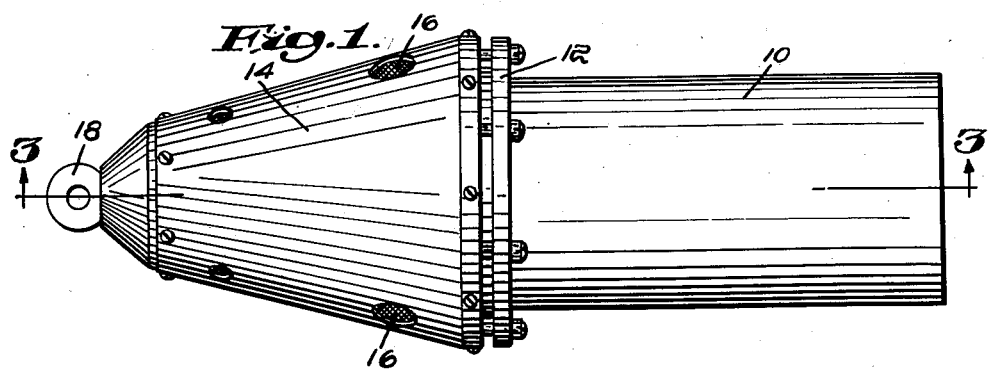
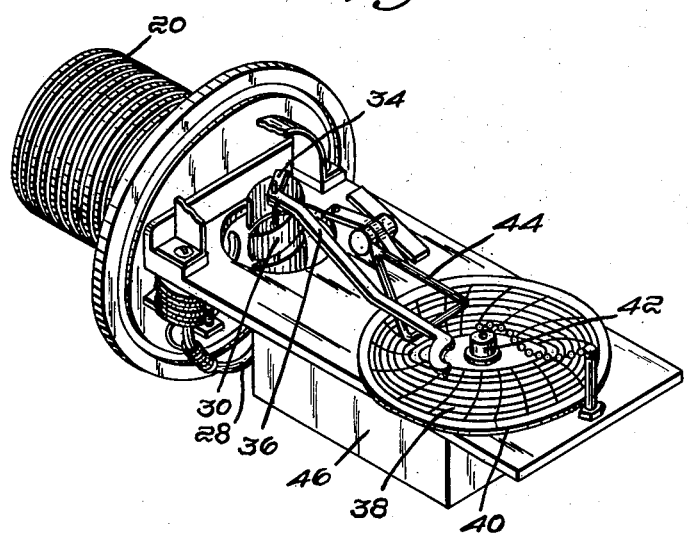
Inventors
Arthur A. Klebba
William M. Ewing
Allyn C. Vine
by M. A. Hayes Attorney April 8, 1952     A. A. KLEBBA ET AL     2,592,159
TIDE GAUGE
Filed Dec. 23, 1946     2 SHEETS—SHEET 2
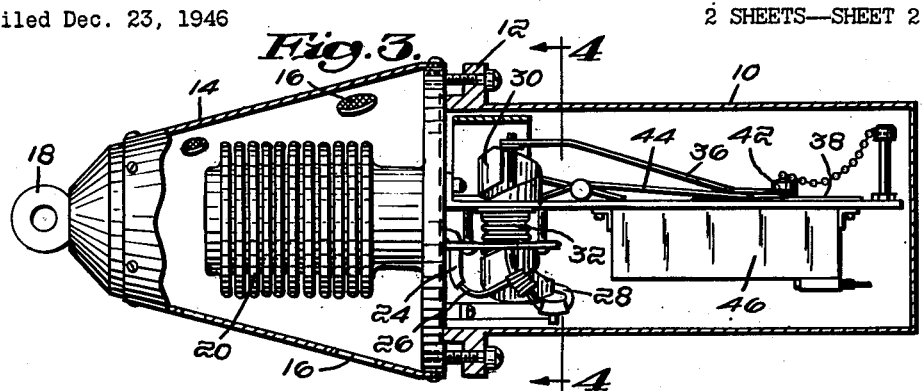
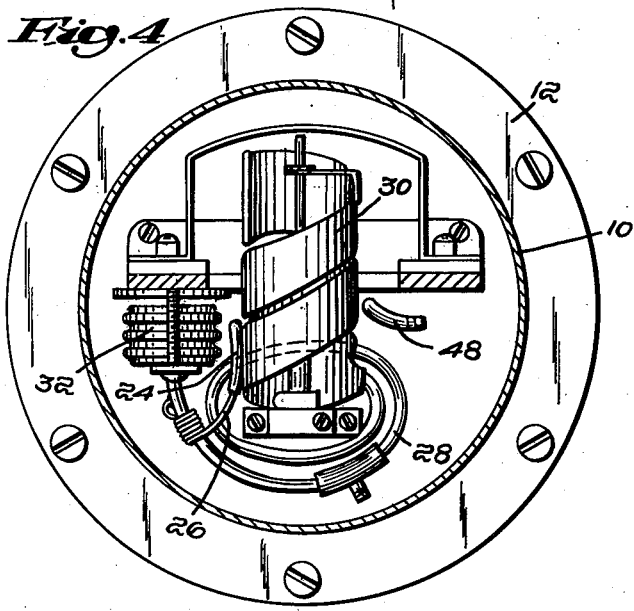
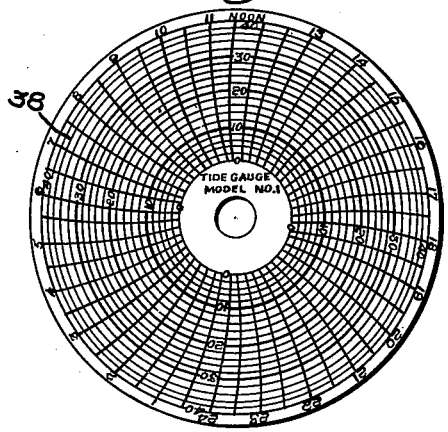
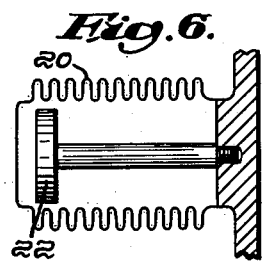

Patented Apr. 8, 1952

2,592,159

UNITED STATES PATENT OFFICE 2,592,159

TIDE GAUGE

Arthur A. Klebba, Allyn C. Vine, and William M. Ewing, Woods Hole, Mass., assignors to the United States of America as represented by the Secretary of the Navy Application December 23, 1946, Serial No. 717,944

5 Claims. (Cl. 73—300)

This invention relates to gauges and more particularly to a portable tide gauge designed to record changes accompanying the rise and fall of the tide.

In designing an instrument of this type, it is necessary to provide a sensitive pressure-recording device which accurately provides a record of depth without being unduly influenced by incidental pressure fluctuations such as may arise from wave formation and other factors.

An object of the invention therefore is to provide an improved tide gauge which will meet with the requirements noted and which will accurately furnish necessary data in connection with tide changes.

In the accompanying drawings:

Fig. 1 is a side elevational view of the tide gauge shown in a horizontally disposed position;

Fig. 2 is a perspective view illustrating a part of the mechanism included in the tide gauge;

Fig. 3 is a cross section taken on the line 3—3 of Fig. 1;

Fig. 4 is a cross section taken on the line 4—4 of Fig. 3;

Fig. 5 is a plan view of a recording chart; and

Fig. 6 is a detail sectional elevation of a bellows member.

The tide gauge of the invention generally comprises a heavy casing in which pressure-sensitive elements are firmly mounted. Connected to these elements is a Bourdon tube which operates a stylus working along a smoked chart in turn driven by a clock mechanism.

Considering this structure in detail, numeral 10 denotes a hollow cylinder closed at one end as indicated at the right-hand side of Fig. 1. At its opposite end, the cylinder is provided with a flange 12 which extends beyond the periphery in the manner shown in Fig. 3.

Bolted to the flange is a conically shaped cap 14, having screened openings 16 through which sea water is allowed to pass. 18 denotes a ring member for suspending the tide gauge casing in water by means of a chain, line, or other desired attaching means. Mounted within the conical cap 14 is a bellows member 20, more clearly shown in Figs. 2 and 3. The bellows consists of a flexible hollow member in which is fixed a stop 22 (Fig. 6), adapted to limit compression of the bellows beyond a certain point. The bellows 20 is filled with a fluid such as for example kerosene.

Connecting with the bellows 20 is a tube 24, also filled with the fluid and which in turn connects with a relatively smaller tube 26. The tubing 26 is coiled around still a third tubing member 28 in the manner shown in Figs. 2, 3 and 4, and is connected into the tubular member 28. The tubular member 28 has one end connected to a Bourdon tube 30. Its other end is connected to a relatively smaller bellows 32 mounted just below the flange 12 (Fig. 4).

A Bourdon stylus clip 34, mounted on a rod, is fastened to the Bourdon tube and operates a stylus member 36 which projects downwardly to lie in sliding contact with a smoked recording chart 38, detachably mounted on a circular hub 40, fixed to shaft 42. A guide-member 44 projects downwardly beneath the stylus arm to lift the stylus so that the chart may be changed. A conventional clock mechanism 46 drives the shaft 42, thus rotating the recording chart 38. The latter member is provided with a scale representing a period of 24 hours, as noted in Fig. 5. A series of concentric circles denoted tide change in feet. As the recording element turns through a 24-hour period, the stylus member, by reason of movement of the Bourdon tube, is caused to move over the surface of the recording element, denoting changes in depth.

Movement of the Bourdon tube results from pressure changes occurring from the sea water applied on the bellows 20. As sea water pressure is exerted on the bellows, a proportionate hydraulic pressure is transmitted through the tubing system described, ultimately being exerted throughout the Bourdon tube, causing it to tend to straighten out or uncoil and thus produce a movement of the stylus member 36 on the rotating chart.

An important feature of the tubing system for transmitting this hydraulic pressure consists in the use of the second small bellows 32 which is connected between the Bourdon tube and the large bellows member. When small fluctuations in pressure develop in the large bellows 20, such as may result from wave motions, these fluctuations in pressure can only be transmitted to Bourdon tube 30 and the bellows 32 through small tube 26. The friction in tube 26 limits the maximum quantity of liquid that can flow through it in a unit time. Therefore, while the pressure may build up at a rapid rate on bellows 20, the change in volume of bellows 20 takes place at a relatively slow rate. The quantity of liquid that passes through tube 26 tends to expand both bellows 32 and Bourdon tube 30. If the change in volume of the bellows 32 for a unit change in pressure is greater than the change in volume of the Bourdon tube for the same change in pressure, the limited volume of fluid that passes through tube 26 tends to expand bellows 32 without greatly changing the volume of Bourdon tube 30. It should be noted that the addition of bellows 32 does not in any way affect the operation of Bourdon tube 30 resulting from relatively slow changes in pressure on bellows 20. The volume of Bourdon tube 30 is determined solely by the pressure of the liquid within the tube. If the pressure remains on bellows 20 for a sufficient length of time to permit enough liquid to flow through tube 26 to equalize the pressure between Bourdon tube 30 and bellows 20, the position of Bourdon tube 30 will be exactly the same as it would have been if bellows 32 was not present. Stated in another way, changes in volume of bellows 20 for rapid changes in pressure is determined primarily by the quantity of fluid that will flow through tube 26 in a unit time while the changes in volume of bellows 20 for slow variations in pressure is determined primarily by the spring constants of bellows 32 and Bourdon tube 30. The constants of bellows 32 should be such that it is still free to expand at the time bellows 20 contacts stop 22. This assures maximum damping of the fluctuations in pressure throughout the entire range of the gauge. This feature of the gauge permits the relatively slow changes in pressure that occur with the rise of the tide to be recorded independently of any small intermittent changes in pressure that may occur due to wave motions.

There is thus provided a simple, efficient and dependable tide gauge. The device is capable of functioning satisfactorily in depths of at least 40 feet. The recording mechanism functions for at least 24 hours.

From the foregoing, it will be evident that we have provided a simple, efficient tide gauge which is adapted for use especially in areas where considerable wave formation is likely to occur. The invention is subject to modification in accordance with the scope of the invention as defined by the claims.

What is claimed is:

1. A tide gauge comprising recording means, a container having a section for admitting water and a separate section for housing said recording means, pressure responsive means in said water receiving section, pressure responsive means in said housing section, and means interconnecting said responsive and said recording means in such manner as to prevent transmission of negligible transient pressure variations to the latter.

2. A tide gauge comprising a pressure tight housing, a pressure recording means disposed within said housing, said recording means having a Bourdon tube as the pressure sensitive element thereof, a first resilient bellows disposed within said housing, a first fluid conducting means having a relatively large bore connecting said first bellows and said Bourdon tube, a second resilient bellows disposed without said housing, second fluid conducting means having a relatively small bore connecting said second bellows to said first fluid conducting means, and a liquid completely filling said bellows, said Bourdon tube and said fluid conducting means and adapted to communicate changes in pressure on said second bellows to said pressure recording means.

3. A tide gauge comprising a pressure tight housing, a pressure recording means disposed within said housing, said recording means having a Bourdon tube as the pressure sensitive element thereof, a first resilient bellows disposed within said housing, said bellows having an incremental change in volume per unit change in pressure that is substantially greater than the incremental change in volume per unit change in pressure of said Bourdon tube, a first fluid conducting means having a relatively large bore connecting said first bellows and said Bourdon tube, a second resilient bellows disposed without said housing, second fluid conducting means having a relatively small bore connecting said second bellows to said first fluid conducting means, and a liquid completely filling said bellows, said fluid conducting means and said Bourdon tube and adapted to communicate changes in pressure on said second bellows to said pressure recording means.

4. A tide gauge comprising a pressure tight housing, a pressure recording means disposed within said housing, said pressure recording means having a Bourdon tube as the pressure sensitive element thereof, a first resilient bellows disposed within said housing, said bellows having an incremental change in volume per unit change in pressure that is substantially greater than the incremental change in volume per unit change in pressure of said Bourdon tube, a first fluid conducting means connecting said first bellows and said Bourdon tube, a second resilient bellows disposed without said housing, a second fluid conducting means connecting said second bellows to said first conducting means, the characteristics of said second conducting means being such that the unit rate of flow of fluid through said conducting means per unit time is small compared to the incremental change in volume of said first bellows for a unit change in pressure and a liquid completely filling said bellows, said conducting means and said Bourdon tube.

5. A tide gauge comprising a pressure tight housing, a pressure recording means disposed within said housing, said pressure recording means having a Bourdon tube as the pressure sensitive element thereof, a first resilient bellows disposed within said housing, said bellows having an incremental change in volume per unit change in pressure that is substantially greater than the incremental change in volume per unit change in pressure of said Bourdon tube, a first fluid conducting means connecting said first bellows and said Bourdon tube, a second housing secured to one wall of said first housing, said second housing being formed with a plurality of openings in the walls thereof, a second resilient bellows disposed within said second housing, a second fluid conducting means connecting said second bellows to said first conducting means, the characteristics of said second conducting means being such that the unit rate of flow of fluid through said conducting means per unit time is small compared to the incremental change in volume of said first bellows for a unit change in pressure and a liquid completely filling said bellows, said conducting means and said Bourdon tube.

ARTHUR A. KLEBBA.
ALLYN C. VINE.
WILLIAM M. EWING.

REFERENCES CITED

The following references are of record in the file of this patent:

UNITED STATES PATENTS

| Number | Name | Date |
| --- | --- | --- |
| 1,790,659 | Gillen et al. | Feb. 3, 1931 |
| 1,957,894 | Longenecker | May 8, 1934 |
| 2,184,689 | Savitz | Dec. 26, 1939 |